UNITED STATES PATENT OFFICE.

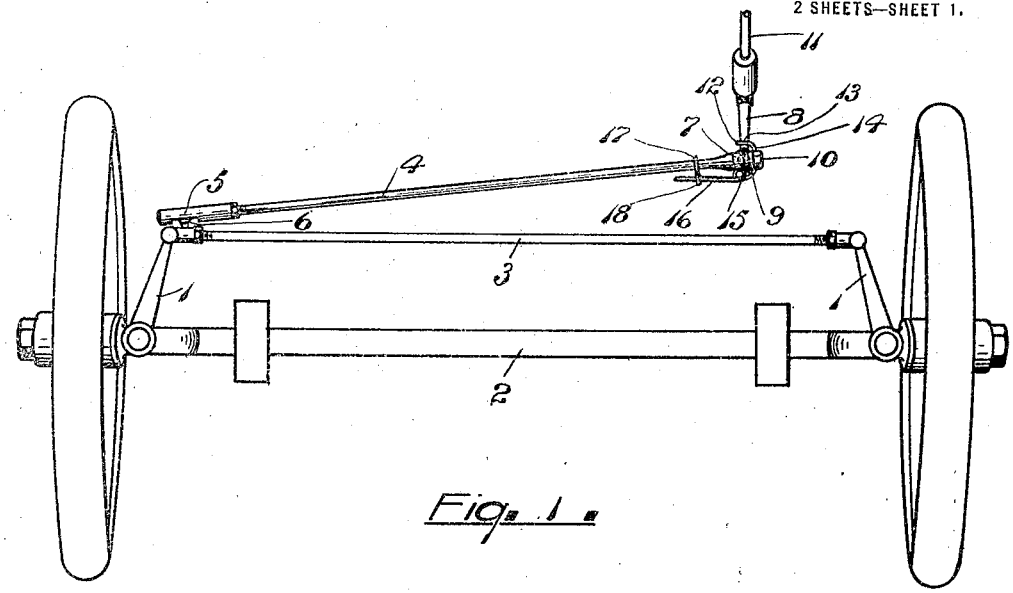
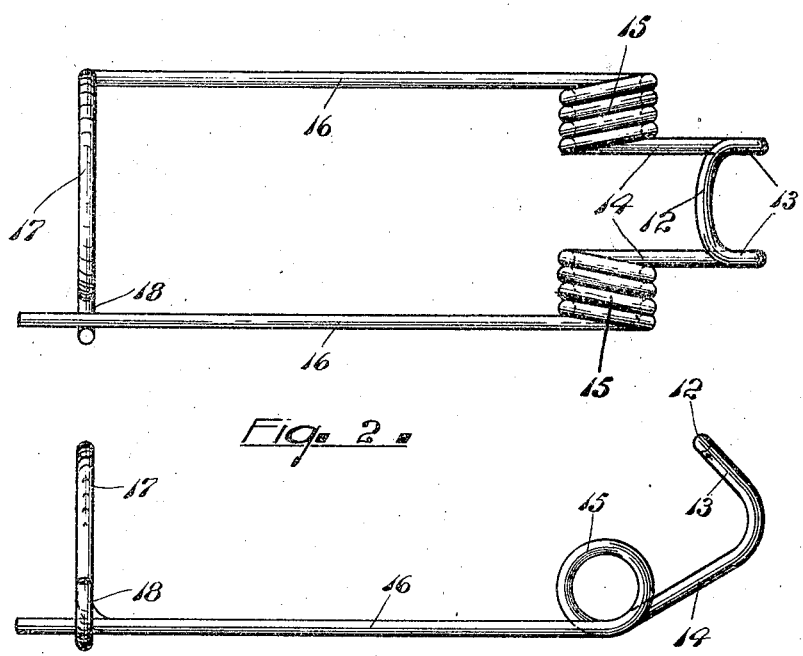

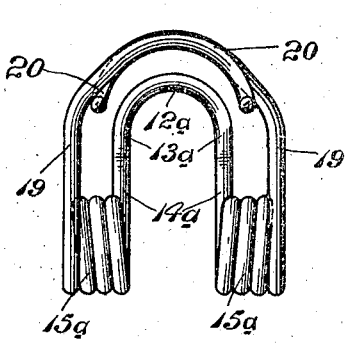
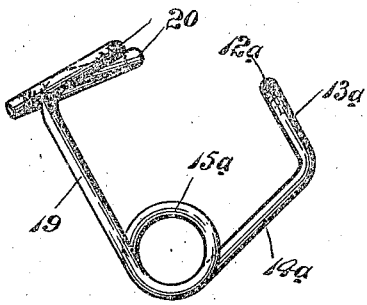
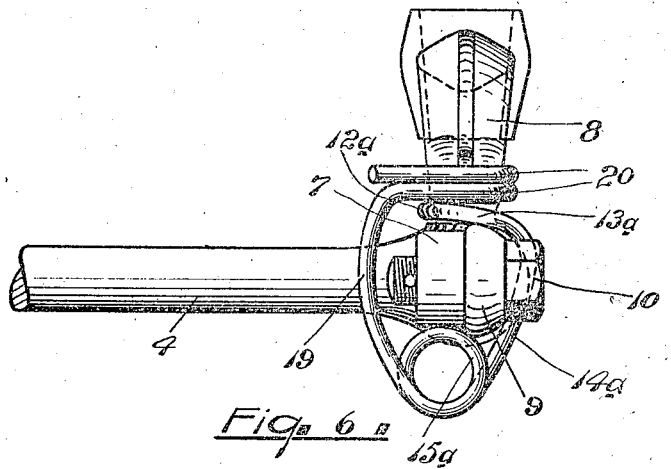
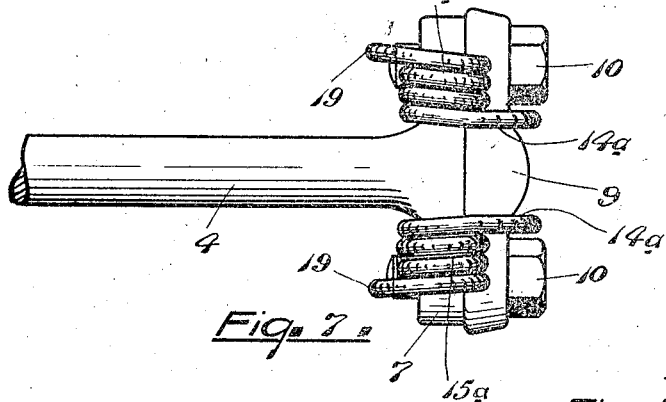

FLOYD GRANT WITHROW, OF GRAND RAPIDS, MICHIGAN.

STEERING-ROD SHOCK-ABSORBING AND ANTIRATTLING DEVICE.

1,383,895. Specification of Letters Patent. Patented July 5, 1921.

Application filed May 3, 1920. Serial No. 378,367.

*To all whom it may concern:*

Be it known that I, FLOYD GRANT WITHROW, a citizen of the United States of America, residing at Grand Rapids, in the county of Kent and State of Michigan, have invented certain new and useful Improvements in Steering-Rod Shock-Absorbing and Antirattling Devices; and I do hereby declare the following to be a full, clear, and exact description of the invention, such as will enable others skilled in the art to which it appertains to make and use the same.

The present invention relates to an antirattling and shock controlling device, particularly adapted for attachment to the arm of a steering rod of a motor vehicle at the joint between said arm and a connecting rod which connects the same with the steering elements connecting the front wheels of the vehicle. It is a primary object and purpose of the invention to provide a structure which can be very quickly and easily attached at the joint and which, when thus attached, serves to prevent any noise or rattle such as ordinarily occurs when the joint has become worn through usage. A further object of the invention is the provision of a device of this character which when applied offers a resistance to movements of the steering apparatus, and in this manner partially stabilizes the front wheels of the vehicle so that the same are not liable to quick and undesired movements which many times result in serious accidents. A still further object of the invention consists in the provision of a device of this character made entirely from wire at a very low cost of manufacture, yet one which is particularly efficient and durable for the purposes stated.

For an understanding of the invention, and the way in which the same is used, reference may be had to the accompanying drawings in which, Figure 1 is a plan view of the front portion of the running gear of a motor vehicle and the steering attachment therefor, my invention being shown applied thereto.

Fig. 2 is a plan view of the anti-rattling device.

Fig. 3 is a side elevation thereof.

Fig. 4 is a side elevation of a modified form of construction.

Fig. 5 is an end view of the construction shown in Fig. 4, from the left hand end of the same.

Fig. 6 is a fragmentary side elevation, showing the application of the construction shown in Figs. 4 and 5 to the joint between the steering arm and connecting rod, and Fig. 7 is an under plan view thereof.

Like reference characters refer to like parts in the different views of the drawings.

With most types of motor vehicles, steering knuckles each having a rearwardly extending arm 1 are pivotally mounted one at each end of the front axle 2, these steering knuckles including spindles on which the front wheels of a vehicle are rotatably mounted. A rod 3 connects the rear ends of arms 1 to which a connecting rod 4 has a pivotal connection at one end, the connection being of the ball and socket type, as illustrated at 5 and 6, the socket 5 being usually carried by the connecting rod 4, while the ball 6 is secured to the rod 3.

At its opposite end the connecting rod 4 is formed with an enlarged head 7 which is provided with a recess or socket to partially receive a ball on the end of an arm 8, the socket being completed and a permanent connection being made by the attachment of a member 9 to the head 7, cap screws 10 being ordinarily used. The steering arm 8 is fixed at the lower end of the usual steering rod or post 11 which, at its upper end, is supplied with a steering wheel (not shown) for operation of the rod. With this construction a turning movement imparted to the rod 11 has the effect of changing direction of the wheels with respect to the front axle of the vehicle and, in this manner, change of direction of the vehicle may be had.

The ball and socket joint between the end of the arm 8 and the end of the connecting rod 4 must necessarily be more or less loose and, in the course of time, this looseness grows, due to the wear of the parts at the joint, whereupon a considerable rattle and disagreeable noise occurs when the vehicle is in motion. I have provided a construction which may be detachably connected to the steering arm 8 and connecting rod 4, the same being formed from a single piece of spring wire bent substantially at its middle point to form a U-shaped loop 12, the legs 13 of which extend for a distance and are then turned for a distance substantially at right angles, as indicated at 14, each being then formed into a spring coil 15, the wires extending from the coils in spaced apart parallel relation, as indicated at 16, for a few inches. One of the wires 16 is formed at its end with an inverted U-shaped loop 17 positioned in a plane substantially at right angles to the plane of the wires 16. This loop is substantially of sufficient breadth to span the distance between the two wires 16 and at its free end is formed into a hook 18 with which the straight wire 16 of the device may be detachably associated.

In practice, the construction thus made is open where the wire 16 connects with the hook 18 and placed over the arm 8 so that this arm may seat in loop 12, the right angular extensions 14 of said legs 13 passing downwardly across the member 9 and the coils 15 lying substantially directly underneath the head 7 and member 9, as shown. The U-shaped loop 17 may be sprung upwardly so as to pass over the connecting rod 4, after which the straight wire 16 may be connected with the hook 18, coils 15 in this manner being placed under tension so that a considerable force is imparted to the arm 8 and the socket members with which the end of the arm is connected, causing the same to be drawn against each other, as will be obvious. The parts 14 of the legs of the loop are of sufficient length to pass across the member 9, as shown in Fig. 1.

With this construction applied to the joint between the steering arm 8 and the connecting rod 4, not only are the ball on the end of the arm 8 and the socket members at the end of the rod 4 brought tightly against each other so as to eliminate any rattle, but at the same time the loop at 12 draws very tightly against the arm 8, whereby a heavy friction is interposed tending to stop movement between the arm 8 and this loop which moves with the connecting rod. This has a tendency to resist quick, jerky movements of either the steering wheel or the front wheels of the vehicle which many times results in a quick and sudden change of direction in the movement of the vehicle, and is thus of considerable value in addition to the anti-rattling function which it possesses.

In Figs. 4 to 7 inclusive, a slightly modified form of construction is used, the loop 12ª, legs 13ª, right angular extensions 14ª and coils 15ª being substantially identical with the similar members previously described, but instead of the coils terminating in parallel wires 16, the coil 15ª terminates in portions 19 which extend upwardly at an angle, as indicated in Fig. 4, each terminating at its end in a bend 20 forming a hook which may pass around the side of the steering arm 8 opposite to that around which the loop 12ª passes. This makes a more compact and neat arrangement and at the same time greater resistance to aimless or sudden movements of the parts of the steering apparatus is provided. Both constructions, in fact, serve in reality as a shock absorber resisting quick and sudden shocks imparted to the steering apparatus which otherwise would respond to said shocks with a quick and sudden change of direction of the vehicle.

Various other modifications in detail may be resorted to without departing from the invention and I do not wish to be limited to the specific modifications shown, but consider myself entitled to all forms of the invention which fall within the scope of the appended claims defining the same.

I claim:

1. In combination, a steering arm, a connecting rod attached at the end thereof and located substantially at right angles thereto, and a wire device having a central U-shaped portion passing around the arm, the legs of the U lying at opposite sides of the steering arm, thence over the connection of the arm to the rod and back under the rod, said device having two end portions connected together detachably and to the rod, substantially as described.

2. A device of the character described, formed from a single length of wire bent at an intermediate portion into U-shape, the legs of the U being bent intermediate their ends to make portions at each side of the bend lying at an angle to each other, said legs being continued and formed into spring coils and the wires extending from the coils being formed at their ends with means to detachably connect with a rod of a motor vehicle steering construction, the direction of the bend in said U-shaped intermediate portion being such that the U bend in said portion is adapted to pass entirely around the steering arm of the steering construction to which said rod is attached, substantially as described.

In testimony whereof I affix my signature.

FLOYD GRANT WITHROW.